United States Patent Office 3,294,714
Patented Dec. 27, 1966

3,294,714
BLENDS OF RUBBERY POLYMERS, ONE HAVING BEEN PREPARED IN THE PRESENCE OF GRINDELIA EXTRACT
William R. Peterson and Ralph E. McNay, Houston, Tex., assignors, by mesne assignments, to Ashland Oil & Refining Company, Ashland, Ky., a corporation of Kentucky
No Drawing. Filed Nov. 2, 1962, Ser. No. 235,128
15 Claims. (Cl. 260—5)

This invention relates to polymer blends comprising two or more different polymers, at least one of which polymers includes an ethylenically unsaturated compound, polymerized either with itself or with one or more other ethylenic compounds copolymerizable therewith.

The properties of good abrasion resistance, high rebound, low hysteresis and high oil capacity which characterize polybutadiene, have made it a particularly attractive synthetic rubber-like polymer. As is the case with most materials of commerce which are outstanding in particular properties, polybutadiene has some shortcomings which decrease its usefulness in various applications. Among these short-comings is that it possesses poor processibility and also has a tendency toward relatively low tensile strength.

Efforts have been made to improve the processibility and as well the tensile strength of articles containing polybutadiene by blending with the polybutadiene polymeric substance which tends toward higher tensile strengths, such as styrene-butadiene resin. Unfortunately, attempts to remedy these deficiencies have produced other problems for styrene-butadiene polymers demonstrate noticeably inferior abrasion resistance, hysteresis and oil capacity in comparison with polybutadiene. Consequently, blends of polybutadiene polymers with styrene-butadiene polymers gain in processibility and tensile strength at the expense of these other important properties. The diminution, moreover, produces lessened abrasion resistance in such blends which is particularly unfortunate, since abrasion resistance is a key factor in the length of service that can be obtained from rubber products such as tire treads and conveyor belts.

There remains, therefore, a demand for improved polymer blends, containing polybutadiene or butadiene-1,3 containing polymers, which possess, inter alia, good processibility characteristics, good tensile strength and improved abrasion resistance. It is a principal object of this invention to fulfill this demand. It is a further object of this invention to provide polymer blends including a butadiene-1,3 containing polymer, without sacrificing other inherently good properties of the butadiene-1,3 containing polymer.

It is also an object of this invention to provide polymer blends containing as a polymeric constituent the emulsion polymerizate of an ethylenic compound either with itself or with one or more different polymerizable ethylenic compounds, the polymerizate being prepared with the aid of a particular polymerization additive which improves the properties of the polymer blends.

Other objects of the invention will become apparent to one skilled in the art upon further consideration of this specification.

In accordance with this invention, these objects have been accomplished in a surprisingly effective manner. In general, the invention comprises polymer blends, hereinafter referred to as "polyblends," which include as a component a particular kind of butadiene-1,3 containing polymer. The term "butadiene-1,3 containing polymer" is used herein to refer to any polymer containing butadiene-1,3, such as polybutadiene or copolymers of butadiene with styrene, acrylonitrile, vinyl pyridine, chloroprene, isoprene and others. The particular kind of butadiene-1,3 polymer required for practicing the present invention is obtained by the emulsion polymerization of butadiene-1,3 with itself or with at least one different ethylenic compound polymerizable therewith, in the presence of an effective amount of polymerization additive derived from the plant Grindelia.

The plant Grindelia from which the polymerization additive of this invention is derived belongs to the tribe Asteroideae of the natural family Compositae. The genus Grindelia includes some 25 species, six or eight of which are found in South America. The remainder occur in the United States mostly west of the Mississippi River, generally in arid and semi-arid plateau regions, although certain species also appear in regions where rainfall is more plentiful. A particularly prevalent plant in the United States is the specie *G. squarrosa*, commonly referred to as "curly cup gumweed." Other well known species are *G. humilis*, "marsh gumweed," *G. camporum*, "field gumweed," *G. robusta*, *G. nana*, *G. fastigiata*, *G. perennis* and *G. blakei*, among others. The varied species are perennial or biennial and produce, in varying amounts depending on the specie, a sticky resinous substance on the stem and leaves and especially on the flower heads. From this characteristic is derived the common name "gum plant" or "gum weed."

The polymerization additive employed according to the present invention can be obtained from the plant Grindelia by conventional extraction means. Thus, the finely pulverized plant including leaves, flower heads and stems is simply leached by percolating therethrough any common hydrocarbon solvent such as V. M. & P. naphtha. The extract is a soft, light amber colored, resinous substance which is substantially soluble in alcohol. This resinous substance is incorporated as a water soluble salt in the emulsion system. However, the substance contains approximately 10% of an alcohol insoluble material which, if separated and discarded by subjecting it to further extraction, renders the residual material an even superior polymerization additive.

By water soluble salts, as used herein, is meant principally the alkali metal salts, particularly the sodium and potassium salts, including the ammonium salt. The salts of the resinous substance are readily prepared in a conventional manner by adding an aqueous solution of the preferred hydroxide of any convenient concentration to an aqueous dispersion of the resinous substance. The resultant mixture is agitated at room temperature until solution is complete. When incorporated in an emulsion polymerization system, the aqueous salt solution may be used in varied concentrations but will generally be employed as about a 10–25% aqueous solution.

The present invention resides in the provision of polyblends including a first polymeric component of one or more polymers prepared in an emulsion polymerization system in the presence of the above-described additives and also including as a second polymeric component one or more other polymers. Typical of the other polymers which can be used as the second polymeric component, or components, are various rubbery, non-rubbery and liquid type polymers including, but not limited to polybutadiene produced by conventional emulsion polymerization techniques, stereoregular polybutadiene, butadiene copolymers, natural rubber, stereoregular polyisoprene, polyolefins, "Neoprene," and butyl rubber. The last-mentioned polymeric materials may be prepared by emulsion polymerization, mass polymerization, condensation or any other technique suitable for the production thereof. Only the first polymeric component, i.e., the polymer prepared with the aid of the Grindelia extract, is required to be prepared by emulsion polymerization techniques.

The polyblends of the present invention may be prepared by any effective mixing procedure. For example, latexes of all the polymeric constituents can be prepared and mixed with one another and may thereafter be coagulated according to conventional techniques. Blending may be accomplished by mixing the polymeric constituents. The polymers may be blended in the solid state on any kind of effective mixing device, such as a two-roll mill.

It is contemplated that the polyblends of the present invention will be useful in the manufacture of synthetic rubbers, plastics and adhesives. In adapting these polyblends to their various uses, they may be prepared in "white rubber" form or they may be masterbatched with carbon black and extender oils. Other additives may be employed. The particular types of carbon black, extender oils and other additives employed in connection with the present polyblends form no part of this invention. Suffice it to say that if blacks, oils and/or other additives are used, they may be those normally employed in the art in connection with the synthetic polymeric materials mentioned herein.

The following example illustrates the extraction of the plant Grindelia and the saponification of the extract. All parts are by weight unless otherwise noted.

EXAMPLE I 1000 parts of the whole plant *G. squarrosa* are pulverized with a hammer mill and subjected to extraction by simple percolation at room temperature with 2000 parts of commercially available V. M. & P. naphtha. After 30 minutes, the resultant slurry is filtered and the filtrate is subjected to distillation to remove the solvent, leaving 120 parts of a resinous substance. 100 parts of the resin are dissolved in 900 parts of methyl alcohol and the resultant slurry is filtered to separate the alcohol insoluble fraction. On distillation to remove the alcohol, 92 parts of purified resinous substance are obtained. 50 parts of the purified resinous substance are suspended in 200 parts of water, neutralized to a pH of 10–11 with 10% sodium hydroxide and agitated at room temperature for 10 minutes. Additional water is then added to give a 15% solution.

In the initial extraction other suitable hydrocarbon solvents include liquid aliphatic hydrocarbons, preferably those containing from about 4 to about 12 carbon atoms, and liquid aromatic hydrocarbons, preferably those containing from 6 to about 12 carbon atoms, and mixtures of aliphatic and aromatic hydrocarbons. Exemplary of these compounds are butane, heptane, octane, iso-octane, M-decane, benzene, toluene, xylene, cumene; and also mineral spirits, naphthas, petroleum ether, kerosene and the like.

The amount of polymerization additive employed in polyblends in acordance with this invention may be quite widely varied. It has been found that polyblends including a butadiene-1,3 containing emulsion polymerizate prepared in the presence of the *G. squarrosa* additive are superior in abrasion resistance, inter alia, to polyblends which are identical in all respects except that the additive has not been used. Favorable results can be obtained when the emulsion system contains as little as 0.5% by weight of the saponified *G. squarrosa* resin based upon the weight of the monomer content. This amount may be considerably increased to as much as about 10%, but the use of the additive in amounts much beyond 10% is not recommended since such larger amounts tend to have a deleterious effect on the reaction. The usual practice, therefore, will be to employ about 3.0–6.0% by weight of the monomer content in which range rubbers having excellent physical properties are obtained. Although the polymerization additive may be incorporated in the emulsion system at varying stages of the polymerization reaction, the most outstanding polymer improvement is obtained if it is present during substantially the entire reaction. The advantages of this invention are not obtained to any measurable degree if the additive is incorporated at any time after the reaction has progressed to any substantial extent. The preferred mode of operation, accordingly, is to have the additive present in the emulsion system from the start of the reaction.

EXAMPLE II

A polybutadiene is prepared by conventional polymerization techniques in an aqueous emulsion system at 41° F. using the following recipe.

| Component: | Parts by weight |
| --- | --- |
| Butadiene | 100.0 |
| Sodium fatty acid soap | 2.14 |
| Potassium salt of disproportionated rosin | 2.25 |
| Sodium alkyl naphthalene sulfonate | 0.15 |
| Paramenthane hydroperoxide | 0.05 |
| NaOH | 0.015 |
| Tert-dodecyl mercaptan | 0.45 |
| Sodium formaldehyde sulfoxylate | 0.08 |
| Sodium salt of ethylene diamine tetraacetic acid | 0.04 |
| Tripotassium phosphate | 0.04 |
| $FeSO_4 \cdot 7H_2O$ | 0.015 |
| Water | 200.0 |

The reaction is short-stopped at 60% conversion in 9.75 hours using 0.10 part of sodium dimethyl dithiocarbamate and 0.05 part of mixed amines. On coagulation of a portion of the latex, the resultant polymer has a Mooney viscosity at 212° F. (ML–4) of 31.

EXAMPLE III

The procedure of Example II is repeated, except that the recipe includes as a polymerization additive 4.0 parts by weight of the sodium salt of Example I, added in the form of a 15% aqueous solution. The reaction is again short-stopped at 60% conversion and the resultant latex has a Mooney viscosity at 212° F. (ML–4) of 31.

EXAMPLE IV

A batch of butadiene-styrene copolymer is prepared by emulsion polymerization at 41° F. in accordance with the following recipe.

| Component: | Parts by weight |
| --- | --- |
| Butadiene | 72.0 |
| Styrene | 28.0 |
| Sodium fatty acid soap | 2.14 |
| Potassium salt of disproportionated rosin | 2.25 |
| Tripotassium phosphate | 0.40 |
| Sodium alkyl naphthalene sulfonate | 0.15 |
| Paramenthane hydroperoxide | 0.09 |
| NaOH | 0.015 |
| Tert-dodecyl mercaptan | 0.16 |
| Potassium pyrophosphate | 0.253 |
| $FeSO_4 \cdot 7H_2O$ | 0.20 |
| Water | 200.0 |

As the reaction proceeds, samples are taken at regular intervals. The samples are coagulated and tested for total solids content. When the total solids content of the latex reaches a value indicating a 60% conversion of the monomers to polymer, the reaction is short-stopped with 0.10 part sodium dimethyl dithiocarbamate and 0.05 part of mixed amines.

EXAMPLE V

Arbitrarily preselected ratios of the latexes recovered from Examples 2, 3 and 4 are blended and are coagulated as masterbatches with HAF carbon black and with phenyl-β-naphthylamine as an antioxidant. The masterbatches are then compounded on a mill with curatives to produce samples having the following constituency.

| Component: | Parts by weight |
|---|---|
| Blended polymers | 100.0 |
| HAF black | 50.0 |
| Phenyl-β-naphthylamine | 1.5 |
| Zinc oxide | 3.0 |
| Stearic acid | 0.75 |
| Santocure | 0.7 |
| Sulfur | 1.9 |

Eight samples are prepared in all. They are all cured for 60 minutes at 293° F. and are all subjected to the following tests: Tensile strength after cure and after 48 hours accelerated aging at 100° C.; modulus in p.s.i. at 300% elongation after cure only; modulus in p.s.i. at 200% elongation after cure and after 48 hours accelerated aging at 100° C.; Shore hardness and elongation after cure and aging under same conditions as above; and loss in weight (in grams) per hour of steady abrasion against an angled surface after cure only. Samples of the masterbatches are also cured and test specimens subjected to the Firestone run temperature test. The constituency of the eight masterbatches and the results of the tests which were run upon them are set forth in Table I as follows:

butadiene of Example II is used in sample VI. In samples VII and VIII respectively, the sole polymeric constituents are the conventional styrene-butadiene and conventional polybutadiene polymers of Examples IV and II. Hereinafter samples II, IV, VII and VIII will sometimes be referred to as conventional rubber.

From close investigation of the test results set forth in Table I, it is apparent that in every case the rubbers prepared from the PBD-SBR polyblends produced in accordance with the invention have strikingly superior abrasion resistance as contrasted with the conventional rubbers. Moreover, other polymeric properties are not degraded. In fact, it is significant that in middle and higher ranges of SBR content, the freshly cured polyblend rubbers of the present invention even exhibit superior tensiles and moduli. Thus the present invention provides at the very least reasonably comparable tensile and modulus properties, but in the majority of instances vastly superior tensile and modulus properties in blends of PBD and SBR without a sacrifice in abrasion resistance. In fact, even in lower ranges of PBD content, the abrasion resistance of the PBD–SBR rubbers prepared in accordance with the invention is far superior to those containing no PBD. This superiority of the present novel polyblends even where the PBD is used in low concentrations is brought out most vividly by comparison of sample V and sample VI—the former demonstrating the present invention and the latter demonstrating the conventional.

Other improvements are also significant. Thus, rubber containing polyblends prepared in accordance with the invention also display a marked degree of superiority in many other properties as well. In middle and high ranges of SBR content, a definitely lower Firestone run temperature is displayed. Aged samples retain a superiority of tensile and modulus values in middle ranges of SBR content. Surprisingly, the aged samples prepared in ac-

Table I

| Sample | I [1] | II | III [1] | IV | V [1] | VI | VII | VIII |
|---|---|---|---|---|---|---|---|---|
| Polymers in Blend | Ex. 3 / Ex. 4 | Ex. 2 / Ex. 4 | Ex. 3 / Ex. 4 | Ex. 2 / Ex. 4 | Ex. 3 / Ex. 4 | Ex. 2 / Ex. 4 | Ex. 4 Only | Ex. 2 Only |
| Ratio of PBD to SBR | 3:1 | 3:1 | 1:1 | 1:1 | 1:3 | 1:3 | | |
| Tensile Strength, p.s.i. [1] | 2,950 | 2,980 | 3,080 | 2,620 | 3,300 | 3,300 | 3,600 | 2,260 |
| 300% Modulus, p.s.i. | 1,700 | 2,350 | 1,820 | 1,510 | 2,020 | 1,960 | 2,060 | 1,520 |
| 200% Modulus, p.s.i. | 930 | 1,330 | 1,010 | 810 | 1,100 | 1,090 | 1,100 | 800 |
| Elongation, Percent | 475 | 355 | 440 | 440 | 425 | 435 | 460 | 390 |
| Shore Hardness | 65 | 68 | 65 | 62 | 65 | 65 | 63 | 62 |
| Angle Abrasion | 6.3 | 7.2 | 6.6 | 8.3 | 7.4 | 8.0 | 9.0 | 6.6 |
| Firestone Run Temp | 303 | 300 | 294 | 307 | 293 | 300 | 287 | 303 |
| Aged 48 hrs. 100° C.: | | | | | | | | |
| Tensile Strength, p.s.i. | 2,980 | 3,150 | 3,140 | 2,970 | 3,200 | 3,440 | 3,580 | 2,550 |
| 200% Modulus, p.s.i. | 2,160 | 2,580 | 2,580 | 2,330 | 2,730 | 2,670 | 2,600 | 2,130 |
| Elongation, Percent | 245 | 220 | 225 | 220 | 225 | 230 | 235 | 220 |
| Shore Hardness | 74 | 75 | 74 | 72 | 75 | 74 | 72 | 73 |

[1] These samples are in accordance with invention.

In the above table, samples I, III and V conform to the present invention in their constituency. Samples II, IV and VI are of substantially identical composition to I, III and V respectively, except that the polybutadiene constituent of samples II, IV and VI was not prepared with the aid of the polymerization additive disclosed in Example I.

The polymer content of samples I and II is 25% conventional styrene/butadiene resin and 75% polybutadiene, sample I containing polybutadiene of the type required for the invention and sample II containing conventional polybutadiene. The polymer content of samples III and IV is 50% conventional styrene/butadiene resin and 50% polybutadiene. Sample IV contains the conventional polybutadiene of Example II. The polymer content of samples V and VI is 75% conventional styrene-butadiene resin and 25% polybutadiene. The conventional polycordance with the invention show small, though significant, consistent superiority in their Shore hardness over conventional polyblend rubber and over both the SBR and PBD controls. The upgrading of all these polymeric properties in accordance with this invention could not be predicted from a prior knowledge of the properties of the polyblend constituents.

Although the invention has been illustrated above in connection with blends of polybutadiene and styrene/butadiene polymers, any one or more of the advantages of the invention may be realized in other polyblends in which one of the constituents is prepared with the aid of the above-described Grindelia plant additive by the emulsion polymerization of a polymerizable ethylenic compound either with itself or with one or more different polymerizable ethylenic compounds. By ethylenic compounds is meant, for example, conjugated diolefins such as butadiene-1,3, methyl-2-butadiene-1,3, chloro-2-butadiene-1,3, piperylene - 2,3 - dimethyl butadiene - 1,3, and the like; aryl olefins such as styrene, vinyl naphthalene, α-methylstyrene, p - chlorostyrene, vinyl toluene, divinyl benzene and the like; α-methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides.

The applicability of the invention is not limited to polyblends containing only synthetic polymers and rubbers. It can be applied to polyblends containing various natural polymers, including natural rubber. This fact is illustrated in the following examples in which all parts are by weight unless the contrary is indicated.

EXAMPLE VI

H & C brand concentrated natural latex is blended with polybutadiene produced in accordance with Example III to produce a number of samples with a weight of 100 parts in which the weight ratios of natural rubber to polybutadiene are 25/75, 50/50 and 75/25. A masterbatch is prepared from each sample using 50 parts HAF carbon black and 1.5 parts phenyl-β-naphthylamine. Each masterbatch is coagulated by conventional methods in a uniform manner. To account for the ordinary loading differences which will occur in polyblends containing varying amounts of polybutadiene and natural rubber, the carbon content of each sample is adjusted by addition of carbon black on a Banbury mill, which is operated at 115 r.p.m. While the mill is in operation, zinc oxide, stearic acid, Philrich 5, Santocure and sulfur are added to the ingredients in the mill. The curatives are added at the end of exactly 7 minutes of mixing. Mixing is terminated after 2 additional minutes of mixing, making a total of 9 minutes. The constituency of the resultant compound is as follows.

| Component: | Parts by weight |
|---|---|
| Natural rubber and PBD | 100.0 |
| HAF carbon black | 50.0 |
| Phenyl-β-naphthylamine | 1.5 |
| Zinc oxide | 3.0 |
| Stearic acid | 1.0 |
| Philrich 5 | 5.0 |
| Santocure (average) | 0.8 |
| Sulfur (average) | 2.2 |

Average values are given for the sulfur and Santocure because it is necessary to use different amounts thereof in samples of varying natural rubber and PBD content. The amounts actually used in each samples appear in Table II.

The above procedure is repeated, except that instead of using the polybutadiene of Example III, the polybutadiene of Example II is used. As indicated previously, the polybutadiene of Example III is prepared with the aid of the polymerization additive derived from G. squarrosa. The additive is not used in Example II. The identities of the various samples and the amounts of curatives therein are summarized in the following table:

*Table II*

| Sample No. | Ratio of Nat. Rub./PBD | PBD Source | Amount of Santocure, parts | Amount of Sulfur, parts |
|---|---|---|---|---|
| IX [1] | 25/75 | Ex. 3 | 0.7 | 2.0 |
| X | 25/75 | Ex. 2 | 0.7 | 2.0 |
| XI [1] | 50/50 | Ex. 3 | 0.8 | 2.2 |
| XII | 50/50 | Ex. 2 | 0.8 | 2.2 |
| XIII [1] | 75/25 | Ex. 3 | 0.9 | 2.4 |
| XIV | 75/25 | Ex. 2 | 0.9 | 2.4 |

[1] These samples are in accordance with the invention.

Samples IX, XI and XIII contain polymer blends prepared in accordance with the invention. Samples X, XII and XIV contain conventional polyblends which respectively correspond to samples IX, XI and XIII in every particular except that the latter contain a polybutadiene emulsion polymerizate prepared with the aid of the G. squarrosa polymerization additive which was not used in making the PBD for samples X, XII and XIV.

During the compounding of the various samples on the Banbury mill, measurements of the maximum stock temperature (° F.) and the total power consumed (watt-hours) are taken. The results are given in the following table:

*Table III*

| Sample No. | Ratio of Nat. Rub./PBD | Banbury Maximum Stock Temperature | Banbury Total Power |
|---|---|---|---|
| IX [1] | 25/75 | 305 | 1,240 |
| X | 25/75 | 312 | 1,285 |
| XI [1] | 50/50 | 270 | 1,015 |
| XII | 50/50 | 275 | 1,060 |
| XIII [1] | 75/25 | 312 | 1,035 |
| XIV | 75/25 | 322 | 1,245 |

[1] These samples are in accordance with invention.

The above results indicate the extent to which the polyblends of the present invention are superior to conventional polyblends in their behavior on Banbury mills and other mixing equipment. It is apparent from a comparison of the results with samples XIII and XIV that polyblends prepared in accordance with the invention and having a major proportion of natural rubber and a minor proportion of PBD make it possible to prepare mixed synthetic and natural rubbers which require considerably less power in compounding than do conventional mixed rubbers containing the same polymers. When the natural rubber content is about 75%, the maximum stock temperature is particularly low.

After the processing and processing tests are completed, all the samples IX through XIV are submitted to the following tests: Rate of extrusion in grams per minute through a standard orifice at standard pressure and minutes to scorch at 275° F. The samples are then cured for 30 minutes at 293° F. after which time a determination is made of tensile strength in pounds per square inch at break. After accelerated aging at 100° C. for 48 hours, the samples are again tested for tensile strength at break. The results are summarized in the following table:

*Table IV*

| Sample | IX [1] | X | XI [1] | XII | XIII [1] | XIV |
|---|---|---|---|---|---|---|
| Ratio of Nat. Rub./PBD | 25/75 | 25/75 | 50/50 | 50/50 | 75/25 | 75/25 |
| Extrusion (Grams/Min.) | 18.1 | 19.0 | 16.9 | 15.6 | 12.3 | 9.7 |
| Scorch MS 275° F | 15 | 15 | 15 | 8 | 14 | 9 |
| Tensile Strength (p.s.i.) | 2,720 | 2,930 | 3,100 | 3,100 | 3,730 | 3,620 |
| Aged 48 hrs. at 100° C.: Tensile Strength (p.s.i.) | 1,900 | 1,940 | 2,250 | 2,160 | 1,930 | 1,420 |
| Tensile Strength Retained Upon Aging (percent) | 69 | 66 | 73 | 70 | 52 | 39 |

[1] These samples are in accordance with invention.

The above test results show that polyblends prepared in accordance with the invention can be extruded faster and scorch less readily than conventional polyblends. It has also been found that polyblends prepared in accordance with this invention shrink less readily. It is apparent from the foregoing data that in middle and high ranges of natural rubber content, the present invention produces blends of natural and synthetic rubber which display superior retention of tensile strength upon aging.

The broad applicability of the present invention is further illustrated in connection with three component systems. Definite improvements may be obtained in polyblends containing polybutadiene, natural rubber and stereoregular polybutadiene through application of the invention, especially with regard to processing operations such as milling and extrusion. Polybutadiene polymers, whether of the conventional emulsion polymerization type or of the stereoregular type high in cis-1,4 structure have been particularly difficult to process. Not only do these polymers tend to band ineffectively and bank poorly in milling, but also they accept pigments reluctantly. The masterbatches are then compounded on a Banbury mill according to the following recipe.

| Component: | Parts by weight |
|---|---|
| Masterbatch | 151.5 |
| Zinc oxide | 1.5 |
| Sulfur | 2.0 |
| Altax | 1.5 |

During the milling of the various samples, their behavior on the mill is visually observed and the observations are recorded. Surface tack is also observed. Extrudibility is determined by actually extruding portions of each compounded sample through a Garvey die and observing the extent to which the product is free from dullness, roughness and broken edges. Portions of each compounded sample are formed into test bars and are cured for 50 minutes each at 293° F. Then the test bars are tested for tensile strength in p.s.i. at break and modulus in p.s.i. at 300% elongation. The constituency of the samples and the results of the tests are summarized in the following table:

Table V

| Sample | XV [1] | XVI | XVII [1] | XVIII |
|---|---|---|---|---|
| Polymer A | Ex. 3 | Ex. 2 | Ex. 3 | Ex. 2. |
| Polymer B | Cis-4 | Cis-4 | Cis-4 | Cis-4. |
| Polymer C | Nat. R | Nat. R | Nat. R | Nat. R |
| Ratio A:B:C | 1:1:2 | 1:1:2 | 1:1:2 | 1:2:1. |
| Milling Behavior | Excellent | Excellent | Good | Very poor. |
| Extrusion Quality | do | Good to excellent. | do | Fair. |
| Tack | Good | Good | do | Fair. |
| Tensile Strength (p.s.i.) | 3,070 | 2,960 | 1,890 | 1,930. |
| Modulus 300% | 1,890 | 1,770 | 1,600 | 1,580. |

[1] These samples are in accordance with invention.

milled product tends to be stiff, is usually entirely void of tack and displays a dull and rough surface. Extruded samples are noticeably rough and dull along the sides of the extruded pieces and extremely so at the front and back edges.

These problems can be solved in some cases by blending relatively large amounts of natural rubber with the polybutadiene. A serious drawback to this approach however, is the fact that the improvement is gained at the expense of using large amounts of the very material that the polybutadiene is intended to replace. We have found that with our invention definite improvements in the processibility of polybutadiene, natural rubber and stereoregular polybutadiene blends can be obtained not only where relatively large amounts of natural rubber are present, but even more significantly where natural rubber content is relatively low. This fact will be demonstrated in the following examples, in which all parts are by weight unless the contrary is indicated.

EXAMPLE VII

Three component rubbery systems are prepared containing natural rubber, a stereoregular polybutadiene high in cis-1,4 content and either a conventional unoriented polybutadiene emulsion polymerizate or an unoriented emulsion polybutadiene prepared with the aid of *G. squarrosa* polymerization additive. The polymers are blended in latex form using "H & C Brand" concentrated natural latex, Phillips' "Cis–4" and emulsion polybutadiene produced in accordance with either Example II or Example III herein, the latter having been polymerized with the aid of the *G. squarrosa* additive. A number of samples are made up, some having a high natural rubber content, others a low natural rubber but high stereoregular polybutadiene content.

Samples of 100 parts by weight of the various blends are each mixed with 50 parts HAF black and 1.5 parts of phenyl-β-naphthylamine as antioxidant and are coagulated by conventional means as masterbatches. The resultant As can be seen from comparing the results on sample XV with those on sample XVI and those on XVII with XVIII, the invention produces definite improvements. Improvements in extrudibility, tensile strength and modulus are demonstrated by the samples containing a 1:1:2 ratio of unoriented PBD, Cis-4 and natural rubber. In the samples containing a 1:2:1 ratio of unoriented PBD, Cis-4 and natural rubber, improvements are noted in all properties tested, except for a slight loss in tensile strength. Thus it is apparent that the invention improves the properties of multi-component polymer systems.

We claim:
1. A blend of polymers comprising a first elastomeric polymeric component of a butadiene-1,3 polymer in admixture with a second polymeric component comprising at least one member selected from the group consisting of natural rubber and synthetic rubbery polymers of conjugated diolefins and mixtures thereof; said first polymeric component having been prepared by emulsion polymerization in the presence of about 0.5 to about 10.0%, by weight of monomer content, of an extract of the plant Grindelia.

2. A blend of polymers according to claim 1 wherein the extract is a hydrocarbon solvent-soluble extract of the plant Grindelia.

3. A blend of polymers according to claim 2 wherein the extract is in the form of a water-soluble salt.

4. A blend of polymers according to claim 2 wherein the extract is also alcohol soluble.

5. A blend of polymers according to claim 4 wherein the extract is in the form of a water-soluble salt.

6. A blend of polymers according to claim 5 wherein said first polymeric component is a homopolymer of butadiene-1,3.

7. A blend of polymers according to claim 5 wherein said first polymeric component is a copolymer of butadiene-1,3 with at least one different ethylenically unsaturated monomer.

8. A blend of polymers according to claim 7 wherein said copolymer is a copolymer of butadiene with styrene.

9. A blend of polymers according to claim 5 wherein the extract is derived from the plant *Grindelia squarrosa*.

10. A blend of polymers according to claim 9 wherein the extract in the form of a water-soluble salt is present in an amount of about 3.0 to 6.0%, by weight of monomer content.

11. A blend of polymers according to claim 10 wherein the extract is in the form of a salt selected from the group consisting of the alkali metal and ammonium salts.

12. A blend of polymers according to claim 11 wherein the second polymeric component is selected from the group consisting of natural rubber, styrene-butadiene copolymer, stereoregular polybutadiene high in cis-1,4 structure and mixtures thereof.

13. A blend of polymers according to claim 12 wherein the second polymeric component is styrene-butadiene copolymer.

14. A blend of polymers according to claim 12 wherein the second polymeric component is natural rubber.

15. A blend of polymers according to claim 12 wherein the second polymeric component is a mixture of natural rubber and stereoregular polybutadiene high in cis-1,4 structure.

References Cited by the Examiner
UNITED STATES PATENTS

| | | | |
|---|---|---|---|
| 2,578,518 | 12/1951 | Ditz et al. | 260—892 |
| 2,582,160 | 1/1952 | Radi | 260—27 |
| 2,688,605 | 9/1954 | Tucker | 260—894 |
| 2,784,165 | 3/1957 | Howland | 260—27 |
| 2,993,874 | 7/1961 | Hoel | 260—27 |
| 3,060,989 | 10/1962 | Railsback et al. | 260—5 |
| 3,085,082 | 4/1963 | Baer et al. | 260—876 |
| 3,151,094 | 9/1964 | Peterson et al. | 260—5 |
| 3,157,608 | 11/1964 | McNay | 260—27 |

MURRAY TILLMAN, *Primary Examiner.*

G. F. LESMES, *Assistant Examiner.*

UNITED STATES PATENT OFFICE
CERTIFICATE OF CORRECTION

Patent No. 3,294,714                            December 27, 1966

William R. Peterson et al.

It is hereby certified that error appears in the above numbered patent requiring correction and that the said Letters Patent should read as corrected below.

Columns 9 and 10, Table V, under the heading "XVII", fourth column, line 4 thereof, for "1:1:2" read -- 1:2:1 --.

Signed and sealed this 24th day of October 1967.

(SEAL)
Attest:

Edward M. Fletcher, Jr.
Attesting Officer

EDWARD J. BRENNER
Commissioner of Patents